United States Patent
Aoki

(10) Patent No.: US 10,886,863 B2
(45) Date of Patent: Jan. 5, 2021

(54) MOTOR DRIVING CONTROL DEVICE AND MOTOR CONTROL METHOD

(71) Applicant: MINEBEA MITSUMI Inc., Nagano (JP)

(72) Inventor: Masato Aoki, Iwata (JP)

(73) Assignee: MINEBEA MITSUMI INC., Nagano (JP)

( * ) Notice: Subject to any disclaimer, the term of this patent is extended or adjusted under 35 U.S.C. 154(b) by 14 days.

(21) Appl. No.: 16/213,113

(22) Filed: Dec. 7, 2018

(65) Prior Publication Data
US 2019/0190410 A1    Jun. 20, 2019

(30) Foreign Application Priority Data

Dec. 20, 2017  (JP) .................................. 2017-243655

(51) Int. Cl.
| H05K 7/20 | (2006.01) |
| H02P 6/12 | (2006.01) |
| H02P 6/24 | (2006.01) |
| H02P 6/28 | (2016.01) |
| H02P 6/15 | (2016.01) |

(52) U.S. Cl.
CPC ................. *H02P 6/12* (2013.01); *H02P 6/15* (2016.02); *H02P 6/24* (2013.01); *H02P 6/28* (2016.02)

(58) Field of Classification Search
CPC .......... H02P 29/0243; H02P 6/12; H02P 6/15; H02P 6/24; H02P 6/28
See application file for complete search history.

(56) References Cited

U.S. PATENT DOCUMENTS

| 2010/0060222 A1* | 3/2010 | Kezobo ................. G01R 31/42 318/490 |
| 2013/0043817 A1* | 2/2013 | Shibuya ................. H02P 6/182 318/400.33 |
| 2015/0042258 A1* | 2/2015 | Takada ..................... H02P 8/10 318/696 |
| 2017/0279387 A1* | 9/2017 | Kaidu ....................... H02P 6/17 |
| 2017/0331411 A1* | 11/2017 | Kitano ..................... H02P 6/06 |

FOREIGN PATENT DOCUMENTS

JP    11-008992 A    1/1999

* cited by examiner

*Primary Examiner* — Muhammad S Islam
(74) *Attorney, Agent, or Firm* — Pearne & Gordon LLP

(57) ABSTRACT

A motor driving control device has a motor driving unit that has a plurality of switching elements and supplies a drive current to three-phase coils of a motor, a control circuit unit for sequentially switching energization patterns of the three-phase coils by outputting a drive control signal for operating the plurality of switching elements to the motor driving unit, and a current detection circuit for detecting a voltage value corresponding to a magnitude of the drive current. the control circuit unit includes a voltage comparison unit for comparing the magnitude of the drive current with a predetermined current threshold value based on the voltage value each time switching of the energization patterns is performed, and a disconnection determination unit for determining whether any one phase of the motor is in a disconnection state, based on a comparison result of the voltage comparison unit for the plurality of energization patterns.

11 Claims, 12 Drawing Sheets

MOTOR DRIVING CONTROL DEVICE AND MOTOR CONTROL METHOD

CROSS REFERENCE TO RELATED APPLICATIONS

This application claims the benefit of Japanese Patent Application No. 2017-243655, filed Dec. 20, 2017, which is hereby incorporated by reference in its entirety.

BACKGROUND

Technical Field

The present disclosure relates to a motor driving control device and a motor control method, and in particular to a motor driving control device and a motor control method that sequentially switch energization patterns of three-phase coils.

Background

Conventionally, a method of monitoring coil abnormalities such as disconnection, short circuit, etc. of each phase coil of a three-phase motor during the operation of the motor has been disclosed (for example, see Japanese Patent Application Laid-Open No. H11-8992).

Japanese Patent Application Laid-Open No. H11-8992 describes that in a coil abnormality detection device for a multi-phase electric motor, whether a pulse output exists in a certain phase during energization for rotationally driving the electric motor is detected by an energization detecting unit configured to detect a pulse output at an energization terminal of each phase coil of the electric motor, thereby determining disconnection or short-circuit of coils during energization.

In the configuration as described in Japanese Patent Application Laid-Open No. H11-8992, it is necessary to use configurations such as a voltage conversion circuit and a filter for detecting current for each phase. Therefore, the configuration of a motor driving control device becomes complicated, and the manufacturing cost of the motor driving control device increases.

The present disclosure is related to providing a motor driving control device and a motor control method that are capable of detecting disconnection of coils with a simple circuit configuration.

SUMMARY

According to an aspect of the present disclosure, a motor driving control device comprises: a motor driving unit that has a plurality of switching elements and supplies a drive current to three-phase coils of a motor; a control circuit unit for sequentially switching energization patterns of the three-phase coils by outputting a drive control signal for operating the plurality of switching elements to the motor driving unit; and a current detection circuit for detecting a voltage value corresponding to a magnitude of the drive current, wherein the control circuit unit includes a voltage comparison unit for comparing the magnitude of the drive current with a predetermined current threshold value based on the voltage value each time switching of the energization patterns is performed, and a disconnection determination unit for determining whether any one phase of the motor is in a disconnection state, based on a comparison result of the voltage comparison unit for the plurality of energization patterns.

Preferably, the control circuit unit repeatedly performs a one-cycle switching control that successively switches the energization patterns of the three-phase coils in a predetermined order, and the disconnection determination unit determines whether any one phase of the motor is in the disconnection state, based on a comparison result of the voltage comparison unit during execution of the one-cycle switching control each time the one-cycle switching control is performed.

Preferably, the voltage comparison unit generates a binary value indicating whether the magnitude of the drive current is larger than the predetermined current threshold value each time the switching of the energization patterns is performed, and generates comparison result information in which binary values generated during execution of the one-cycle switching control are arranged in respective digits in a predetermined order corresponding to a switching order of the energization patterns each time the one-cycle switching control is performed, and the disconnection determination unit determines whether any one phase of the motor is in a disconnection state, based on whether the comparison result information is coincident with predetermined abnormal value information.

Preferably, each time the one-cycle switching control is executed, the disconnection determination unit calculates a new determination value based on an evaluation value based on the comparison result of the voltage comparison unit during the one-cycle switching control and a determination value calculated based on evaluation values obtained until then, and determines whether the motor is in an abnormal state based on a comparison result between the new determination value and a predetermined abnormality determination threshold value.

Preferably, the control circuit unit further includes a delay circuit for generating a comparison start timing signal indicating a timing that is delayed by a predetermined time from a timing at which the energization pattern is switched each time switching of the energization patterns is performed, and the voltage comparison unit compares, based on the comparison start timing signal, the magnitude of the drive current with a predetermined current threshold value based on the voltage value at the timing which is delayed by the predetermined time from the timing at which the energization pattern is switched.

Preferably, the control circuit unit further includes a drive stopping unit for performing control of stopping driving of the motor based on a determination result of the disconnection determination unit.

Preferably, the disconnection determination unit is capable of identifying one phase in a disconnection state based on the comparison result of the voltage comparison unit, and when one phase in a disconnection state is identified by the disconnection determination unit, the drive stopping unit switches whether to stop the motor or not based on an identification result of the one phase in the disconnection state.

Preferably, the control circuit unit is provided in association with each of the three-phase coils, and is configured to output the drive control signal by using three position detection sensors for outputting a signal according to a rotational position of the motor, and the disconnection determination unit is capable of identifying one phase in a disconnection state based on the comparison result of the voltage comparison unit, and when activation of the motor is started after one phase in the disconnection state is identified by the disconnection determination unit, the control circuit unit starts the activation of the motor after a rotor of the motor is locked to a phase different from the one phase in the disconnection state.

Preferably, the motor driving control device further comprises an auxiliary energization circuit capable of energizing any two phases of the motor, wherein the disconnection determination unit is capable of identifying one phase in a disconnection state based on the comparison result of the voltage comparison unit, and when one phase in a disconnection state is identified by the disconnection determination unit, the control circuit unit energizes the predetermined two phases other than the identified one phase in the disconnection state by using the auxiliary energization circuit to activate the motor.

According to another aspect of the present disclosure, a motor control method of controlling driving of a motor by using a motor driving control device including a motor driving unit having a plurality of switching elements and supplying a drive current to three-phase coils of the motor, a control circuit unit for sequentially switching energization patterns of the three-phase coils by outputting a drive control signal for operating the plurality of switching elements to the motor driving unit, and a current detection circuit for detecting a voltage value corresponding to the magnitude of the drive current, comprises: a voltage comparison step of comparing the magnitude of the drive current with a predetermined current threshold value based on the voltage value each time switching of the energization patterns is performed; and a disconnection determination step of determining whether any one phase of the motor is disconnected, based on a comparison result of the voltage comparison step for a plurality of energization patterns.

According to these disclosures, a motor driving control device and a motor control method that can detect disconnection of coils with a simple circuit configuration can be provided.

DETAILED DESCRIPTION

Hereinafter, a motor driving control device according to an embodiment of the present disclosure will be described with reference to the accompanying drawings.

Embodiment

Figure 1:
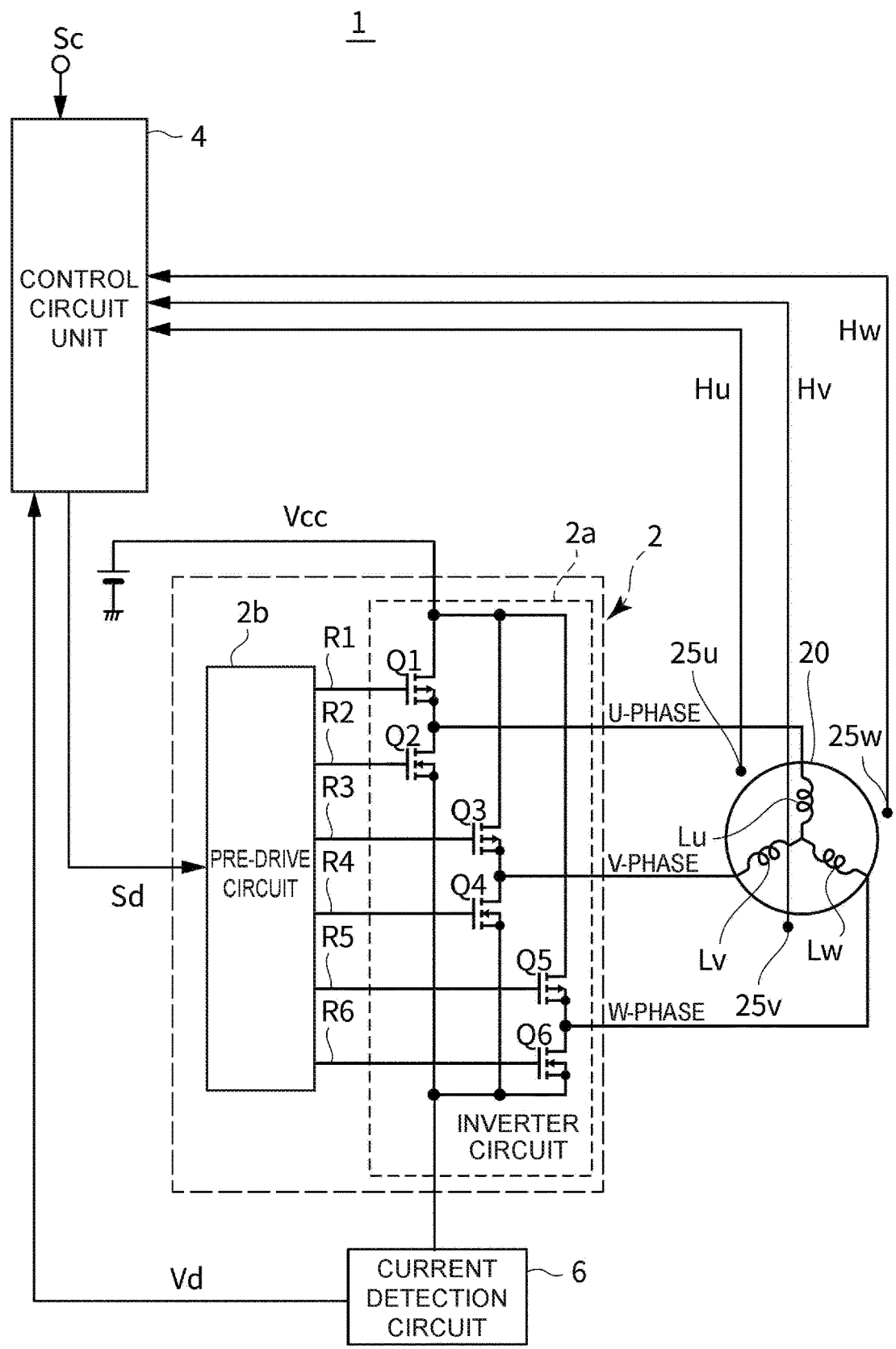
FIG. 1 is a diagram showing a circuit configuration of a motor driving control device according to an embodiment of the present disclosure.

FIG. 1 is a diagram showing a circuit configuration of a motor driving control device according to an embodiment of the present disclosure.

As shown in FIG. 1, a motor driving control device 1 is configured to drive a motor 20 by supplying a drive current to the motor 20. In the present embodiment, the motor 20 is, for example, a three-phase brushless motor having coils Lu, Lv, Lw of U-phase, V-phase, and W-phase.

The motor driving control device 1 rotates the motor 20 by supplying the drive current to the coils Lu, Lv, Lw of the respective phases of the motor 20 based on a signal corresponding to rotation of a rotor of the motor 20.

In the present embodiment, three Hall elements (an example of a position detection sensor) $25u$, $25v$, $25w$ for outputting signals according to the rotational position of the motor 20 are arranged in the motor 20 in connection with the coils Lu, Lv, Lw of the respective phases. The three Hall elements $25u$, $25v$ and $25w$ are arranged, for example, at substantially equal intervals (at an interval of 120 degrees between the adjacent ones) around the rotor of the motor 20. The Hall elements $25u$, $25v$ and $25w$ detect the magnetic poles of the rotor and output output signals Hu, Hv, and Hw (hereinafter also referred to as Hall signals Hu, Hv, and Hw), respectively. The Hall signals Hu, Hv, and Hw are signals corresponding to the rotational position of the rotor of the motor 20. The rotational position of the rotor can be estimated based on the Hall signals Hu, Hv, and Hw.

The motor driving control device 1 includes a motor driving unit 2 that includes plural switching elements Q1 to Q6 and supplies drive current to the three-phase coils Lu, Lv, and Lw of the motor 20, a control circuit unit 4 for outputting, to the motor driving unit 2, a drive control signal Sd for operating the plural switching elements Q1 to Q6 to sequentially switch the energization pattern of the three-phase coils Lu, Lv, and Lw, and a current detection circuit 6 for detecting a voltage value corresponding to the magnitude of the drive current. The components of the motor driving control device 1 shown in FIG. 1 are a part of the whole, and the motor driving control device 1 may include other components in addition to the components shown in FIG. 1.

In the present embodiment, the motor driving control device 1 is an integrated circuit device (IC) in which the whole of the motor driving control device 1 is packaged. Note that a part of the motor driving control device 1 may be packaged as one integrated circuit device or the whole or a part of the motor driving control device 1 may be packaged together with another device to form one integrated circuit device.

The motor driving unit 2 selectively energizes the three-phase coils of the motor 20. The motor driving unit 2 includes an inverter circuit $2a$ and a pre-drive circuit $2b$. The inverter circuit $2a$ selectively energizes the coils Lu, Lv, and Lw of the motor 20 based on the output signals R1 to R6 output from the pre-drive circuit $2b$ to rotate the motor 20.

In the present embodiment, the inverter circuit 2a includes six switching elements Q1 to Q6 for supplying a drive current to each of the coils Lu, Lv and Lw of the motor 20. The switching elements Q1, Q3, and Q5 are high-side switching elements each comprising a P-channel MOSFET (Metal-Oxide-Semiconductor Field Effect Transistor) arranged on a positive electrode side of a power supply Vcc, and a power supply voltage of the power supply Vcc is applied to the switching elements Q1, Q3 and Q5. The switching elements Q2, Q4, and Q6 are low-side switching elements each comprising an N-channel MOSFET arranged on a negative electrode side of the power supply Vcc. Two switching elements are connected in series in each of the combination of the switching elements Q1 and Q2, the combination of the switching elements Q3 and Q4, and the combination of the switching elements Q5 and Q6. These three sets of series circuits are connected in parallel to form a bridge circuit. The connection point between the switching elements Q1 and Q2 is connected to the coil Lu of the U-phase, the connection point between the switching elements Q3 and Q4 is connected to the coil Lv of the V-phase, and the connection point between the switching elements Q5 and Q6 is connected to the coil Lw of the W-phase.

The pre-drive circuit 2b generates an output signal for driving the inverter circuit 2a and outputs the output signal to the inverter circuit 2a under the control of the control circuit unit 4. The pre-drive circuit 2b has multiple output terminals connected to the respective gate terminals of the six switching elements Q1 to Q6 of the inverter circuit 2a. The pre-drive circuit 2b outputs the output signals R1 to R6 from the respective output terminals in response to the drive control signal Sd output from the control circuit unit 4 to control the on/off operation of the switching elements Q1 to Q6. Upon output of these output signals R1 to R6, the switching elements Q1 to Q6 corresponding to the respective output signals R1 to R6 are turned on or off, so that the drive signal is outputted to the motor 20 and power is supplied to each phase of the motor 20.

In the present embodiment, the Hall signals Hu, Hv, and Hw output from the Hall elements 25u, 25v, 25w and a rotational speed command signal Sc are input to the control circuit unit 4.

The Hall signals Hu, Hv, and Hw are input from the motor 20 to the control circuit unit 4. The control circuit unit 4 outputs the drive control signal Sd by using the three Hall elements 25u, 25v and 25w. That is, the control circuit unit 4 obtains actual rotational speed information on the actual rotational speed of the rotor of the motor 20 by using the Hall signals Hu, Hv, and Hw, and controls the driving of the motor 20. Furthermore, the control circuit unit 4 detects the rotational position of the rotor of the motor 20 by using the Hall signals Hu, Hv, Hw, and controls the driving of the motor 20.

The present embodiment may be configured so that other information on the rotational state of the motor 20 is input to the control circuit unit 4 in addition to the Hall signals Hu, Hv, and Hw as described above. For example, a signal (pattern FG) generated by using a coil pattern provided on the substrate on a rotor side may be input as an FG signal corresponding to the rotation of the rotor of the motor 20. Furthermore, the present embodiment may be configured so that the rotational state of the motor 20 is detected based on the detection result of the rotational position detection circuit for detecting the back electromotive force induced in each phase (U-phase, V-phase, W-phase) of the motor 20. An encoder, a resolver or the like may be provided so that information such as the rotational speed of the motor 20 is detected by the encoder, resolver or the like.

The rotational speed command signal Sc is input, for example, from the outside of the control circuit unit 4. The rotational speed command signal Sc is a signal related to the rotational speed of the motor 20. For example, the rotational speed command signal Sc is a PWM (pulse width modulation) signal corresponding to a target rotational speed of the motor 20. In other words, the rotational speed command signal Sc is information corresponding to a target value of the rotational speed of the motor 20. Note that a clock signal may be input as the rotational speed command signal Sc.

The control circuit unit 4 comprises, for example, a microcomputer, a digital circuit or the like. The control circuit unit 4 outputs a drive control signal Sd for driving the motor 20 to the motor driving unit 2 and controls the rotation of the motor 20. The control circuit unit 4 sequentially switches the energization patterns of the three-phase coils Lu, Lv, and Lw by outputting the drive control signal Sd for operating the six switching elements Q1 to Q6 to the motor driving unit 2. That is, the control circuit unit 4 outputs the drive control signal Sd to the pre-drive circuit 2b based on the Hall signals Hu, Hv, and Hw and the rotational speed command signal Sc. The control circuit unit 4 outputs the drive control signal Sd to control the rotation of the motor 20 and rotate the motor 20 at the rotational speed corresponding to the rotational speed command signal Sc.

Since the motor 20 has the three-phase coils Lu, Lv, and Lw, the motor 20 has six energization patterns. That is, the motor 20 has (1) a first energization pattern of the combination of the high side U-phase and the low side V-phase, (2) a second energization pattern of the combination of the high side U-phase and the low side W-phase, (3) a third energization pattern of the combination of the high side V-phase and the low side W-phase, (4) a fourth energization pattern of the combination of the high side V-phase and the low side U-phase, (5) a fifth energization pattern of the combination of the high side W-phase and the low side U-phase, and (6) a sixth energization pattern of the combination of the high side W-phase and the low side V-phase.

When the motor 20 is rotated in a predetermined direction, the control circuit unit 4 repeatedly performs one-cycle switching control in which all of the six energization patterns are successively switched in a predetermined order. The predetermined order is, for example, the order of the first energization pattern, the second energization pattern, the third energization pattern, the fourth energization pattern, the fifth energization pattern, and the sixth energization pattern.

When the motor 20 is rotated in a direction opposite to the predetermined direction, the control circuit unit 4 repeatedly performs one-cycle switching control in which all of the six energization patterns from the first energization pattern to the sixth energization pattern are successively switched in the reverse order to the predetermined order (in the order from the sixth energization pattern to the first energization pattern)

The current detection circuit 6 detects a voltage value corresponding to the magnitude of the drive current of the motor 20. In the present embodiment, the current detection circuit 6 includes a current detection resistor arranged between the inverter circuit 2a and the ground potential (the negative electrode of the power supply Vcc), and detects the voltage value corresponding to the coil current of the motor 20. That is, the coil currents flowing through the respective phases of the coils Lu, Lv, and Lw of the motor 20 pass through the inverter circuit 2a, pass through the current detection resistor, and flow to the ground potential. The current detection circuit 6 can detect the magnitude of the coil current of the motor 20 as a voltage value from the voltage across the current detection resistor. The current detection circuit 6 outputs a detection voltage signal (an example of the voltage value) Vd which is a detection result. The detection voltage signal Vd corresponds to the magnitude of the driving current of the motor 20. The detection voltage signal Vd is input to the control circuit unit 4.

[Description of the Control Circuit Unit 4]

In the present embodiment, the control circuit unit 4 has an abnormality determination function for determining whether any one phase of the motor 20 is in a disconnection state (a state in which the coil or the like of the phase is disconnected). That is, the control circuit unit 4 functions as a voltage comparison unit for comparing the magnitude of the drive current of the motor 20 with a predetermined current threshold value based on the voltage value detected by the current detection circuit 6 each time the energization pattern is switched. In addition, the control circuit unit 4 functions as a disconnection determination unit for determining based on the comparison result between the magnitude of the drive current for the plural energization patterns and the predetermined current threshold value whether any one phase of the motor 20 is in the disconnection state. In other words, the control circuit unit 4 executes a motor control method including a voltage comparison step of comparing the magnitude of the drive current with the predetermined current threshold value based on the voltage value detected by the current detection circuit 6 each time the energization pattern is switched, and a disconnection determination step of determining based on the comparison result of the voltage comparison step for the plural energization patterns whether any one phase of the motor 20 is in the disconnection state. The control circuit unit 4 functions as a drive stopping unit for performing control to stop the driving of the motor 20 based on a determination result as to whether any one phase of the motor 20 is in the disconnection state. As described above, the control circuit unit 4 repeatedly performs the one-cycle switching control of successively switching the six energization patterns of the three-phase coils Lu, Lv, and Lw in a predetermined order, and the disconnection determination unit determines whether any one phase of the motor 20 is in the disconnection state based on the comparison result of the voltage comparison unit during execution of the one-cycle switching control each time the one-cycle switching control is executed.

Figure 2:
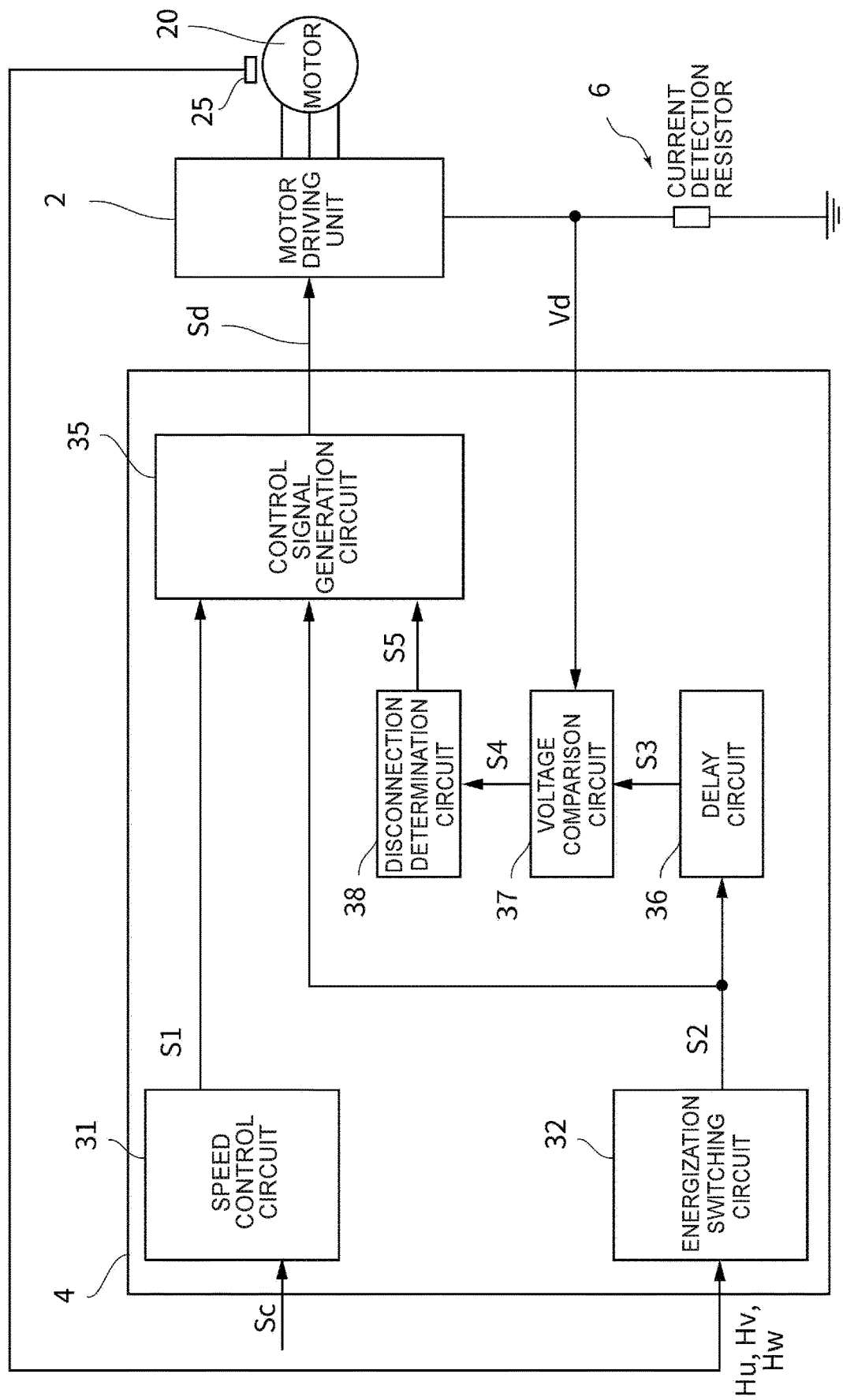
FIG. 2 is a block diagram showing a configuration of a control circuit unit.

FIG. 2 is a block diagram showing a configuration of the control circuit unit 4.

The configuration of the control circuit unit 4 and the transmission and reception of signals, information, etc. among the respective circuits, which are mainly associated with the description on the abnormality determination function, are shown in FIG. 2. The Hall elements 25*u*, 25*v* and 25*w* are illustrated as being simplified as a single Hall element 25.

As shown in FIG. 2, the control circuit unit 4 includes a speed control circuit 31, an energization switching circuit 32, a control signal generation circuit (an example of the drive stopping unit) 35, a delay circuit 36, a voltage comparing circuit (an example of the voltage comparison unit) 37 and a disconnection determination circuit (an example of the disconnection determination unit) 38.

The rotational speed command signal Sc is input to the speed control circuit 31. The speed control circuit 31 outputs a rotational speed signal 51 based on the rotational speed command signal Sc so that the motor 20 rotates at the rotational speed corresponding to the rotational speed command signal Sc. The speed control circuit 31 outputs the rotational speed signal 51 based on actual rotational speed information (not shown) on the actual rotational speed of the rotor of the motor 20 which is obtained based on the Hall signals Hu, Hv, and Hw input to the control circuit unit 4.

The Hall signals Hu, Hv, and Hw are input to the energization switching circuit 32. The energization switching circuit 32 outputs an energization switching command signal S2 for switching the energization pattern according to the rotational position of the motor 20. That is, the energization switching circuit 32 performs switching control of the energization pattern by outputting the energization switching command signal S2. The energization switching command signal S2 is, for example, a signal which enables discrimination of a timing at which the outputs of the Hall signals Hu, Hv, and Hw are mutually switched between a high level and a low level, but is not limited to this signal. The energization switching command signal S2 is input to the control signal generation circuit 35 and the delay circuit 36.

The energization switching command signal S2 is input to the delay circuit 36. The delay circuit 36 can be configured by using, for example, a coil element or the like. The delay circuit 36 generates a comparison start timing signal S3 indicating a timing which is delayed by a predetermined time from a timing at which the energization pattern is switched each time the energization pattern is switched. Specifically, when the energization pattern is switched and the energization switching command signal S2 is input, the delay circuit 36 generates the comparison start timing signal S3 indicating a timing delayed by the predetermined time from an input timing of the energization switching command signal S2. The comparison start timing signal S3 is input to the voltage comparison circuit 37. Note that the predetermined time is set in consideration of the delay of the operation of the inverter circuit 2*a* of the motor driving unit 2 with respect to the output timing of the drive control signal Sd output from the control circuit unit 4.

The voltage value detected by the current detection circuit 6 is input to the voltage comparison circuit 37. The voltage comparison circuit 37 compares the magnitude of the drive current with the predetermined current threshold value based on the voltage value detected by the current detection circuit 6 each time the energization pattern is switched. The voltage comparison circuit 37 outputs comparison result information S4 generated based on the comparison result.

Specifically, the detection voltage signal Vd detected by the current detection resistor of the current detection circuit 6 is input to the voltage comparison circuit 37. In addition, the comparison start timing signal S3 generated by the delay circuit 36 is input to the voltage comparison circuit 37. The voltage comparison circuit 37 includes, for example, a comparator, etc., and compares the magnitude of the drive current with a predetermined current threshold value based on the detection voltage signal Vd corresponding to the magnitude of the drive current of the motor 20, thereby enabling determination as to whether or not the motor 20 is in a non-energization state in which the magnitude of the drive current is lower than the predetermined threshold value. For example, the voltage comparison circuit 37 can determine whether the motor 20 is in the non-energization state by comparing the detection voltage signal Vd with the voltage corresponding to the predetermined current threshold value. The determination is performed based on the comparison start timing signal S3. That is, based on the comparison start timing signal S3 and based on the detection voltage signal Vd at the timing delayed by the predetermined time from the timing at which the energization pattern is switched, the voltage comparison circuit 37 compares the magnitude of the drive current at that timing with the predetermined current threshold value.

In the present embodiment, the voltage comparison circuit 37 performs energization switching frequency management processing and current detection processing as described later. The voltage comparison circuit 37 generates the comparison result information S4 based on the comparison start timing signal S3, that is, based on the energization switching command signal S2. The voltage comparison circuit 37 generates a binary value indicating whether the magnitude of the drive current is larger than the predetermined current threshold value each time the energization pattern is switched, and generates the comparison result information S4 each time the one-cycle switching control is performed. As described later, the comparison result information S4 is a value in which binary values generated during execution of the one-cycle switching control are arranged at respective digits in a predetermined order corresponding to a switching order of the energization patterns. In other words, the voltage comparison circuit 37 generates, as the comparison result information S4, the comparison result between the magnitude of the drive current based on the detection voltage signal Vd during execution of the one-cycle switching control and the predetermined current threshold value each time the one-cycle switching control is performed. It can be regarded that comparison results between the magnitude of the drive current and the predetermined current threshold value for plural energization patterns are contained in the comparison result information S4.

Note that the predetermined current threshold value to be compared with the magnitude of the drive current may be set to a value which is slightly larger than the magnitude of the drive current in a state where almost no current flows in the motor 20. That is, when a drive current for rotating the motor 20 flows in the motor 20, the magnitude of the drive current is normally higher than the predetermined current threshold value.

The disconnection determination circuit 38 determines whether any one phase of the motor 20 is in the disconnection state based on the comparison result of the voltage comparison circuit 37 during execution of the one-cycle switching control each time the one-cycle switching control is performed. The comparison result information S4 output from the voltage comparison circuit 37 is input to the disconnection determination circuit 38. The disconnection determination circuit 38 performs abnormality detection processing based on the comparison result information S4 in a way described later, and outputs an abnormality determination signal S5 corresponding to whether the motor 20 is in an abnormal state where any one phase of the motor 20 is in the disconnection state.

The control signal generation circuit 35 outputs the drive control signal Sd based on the rotational speed signal S1 output from the speed control circuit 31, the energization switching command signal S2 output from the energization switching circuit 32, and the abnormality determination signal S5 output from the disconnection determination circuit 38. That is, when the abnormality determination signal S5 corresponding to the abnormal state in which any one phase of the motor 20 is in the disconnection state is not output from the disconnection determination circuit 38, the control signal generation circuit 35 generates the drive control signal Sd in response to the rotational speed signal S1 output from the speed control circuit 31, and outputs the drive control signal Sd to the motor driving unit 2. At this time, the control signal generation circuit 35 generates the drive control signal Sd for sequentially switching the energization pattern of the drive signal in response to the energization switching command signal S2 output from the energization switching circuit 32.

In the present embodiment, the drive control signal Sd is a PWM (pulse width modulation) signal. The torque of the motor 20 can be adjusted by adjusting the duty ratio of the drive control signal Sd.

In the present embodiment, the control signal generation circuit 35 functions as a drive stopping unit for stopping the driving of the motor 20 based on the determination result of the disconnection determination circuit 38. That is, when the abnormality determination signal S5 corresponding to the abnormal state, that is, the state in which any one phase of the motor 20 is in the disconnection state is output from the disconnection determination circuit 38, the control signal generation circuit 35 outputs the drive control signal Sd in response to the abnormality determination signal S5, and performs an abnormality coping operation.

For example, the control signal generation circuit 35 functions as the drive stopping unit, and stops the driving of the motor 20 as the abnormality coping operation. For example, by outputting the drive control signal Sd, the control signal generation circuit 35 turns off all the switching elements Q1 to Q6 to stop the driving of the motor 20.

An abnormality determination function will be described hereinafter.

Figure 3:
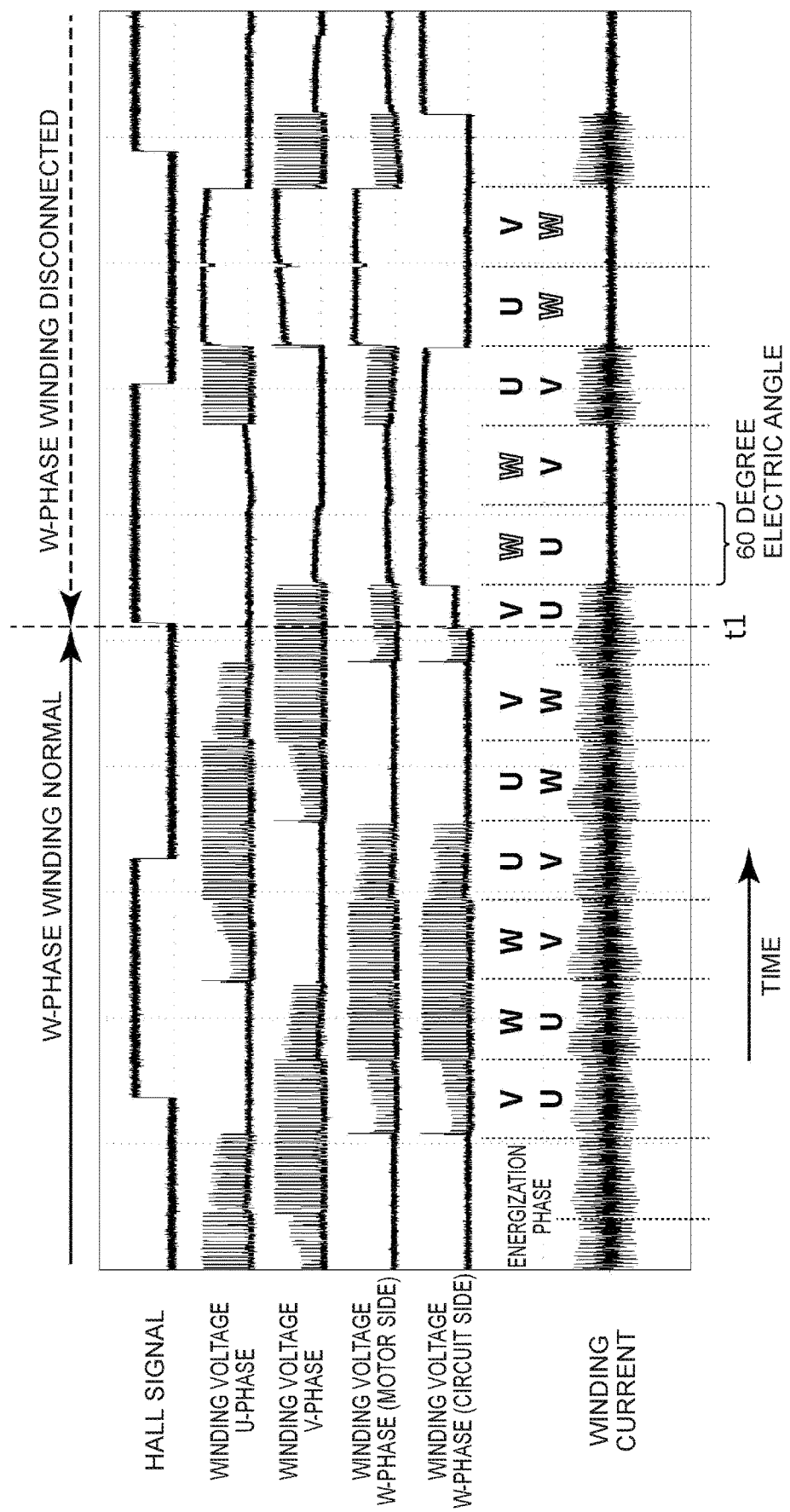
FIG. 3 is a diagram showing an example of an abnormal state.

FIG. 3 is a diagram showing an example of the abnormal state.

The waveform of the Hall signal, the waveform of a winding voltage of the U-phase, the waveform of a winding voltage of the V-phase, the waveform of a winding voltage of the W-phase (on the side of the motor 20), the waveform of a winding voltage of the U-phase (on the side of the motor driving unit 2), and the waveform of a winding current are shown from the upper side in FIG. 3. The waveform of the winding current corresponds to the waveform of the drive current, that is, the waveform of the detection voltage signal Vd detected by the current detection circuit 6.

As shown in FIG. 3, all the coils Lu, Lv, and Lw of the motor 20 are normal, and thus the motor 20 is normally driven until a time t1. That is, with the rotation of the motor 20, a voltage is applied to each of the coils Lu, Lv, and Lw of the respective phases while switching plural energization patterns. At this time, the winding current flows substantially in a similar manner in each energization pattern.

When the coil Lw of the W-phase is disconnected at the time t1, no current flows during the energization patterns in which current flows in the disconnected W-phase. That is, the winding current is substantially equal to zero in the two energization patterns (the fifth energization pattern and the sixth energization pattern) in which the W-phase is set to the high side and the two energization patterns (the second energization pattern and the third energization pattern) in which the W-phase is set to the low side.

Figure 4:
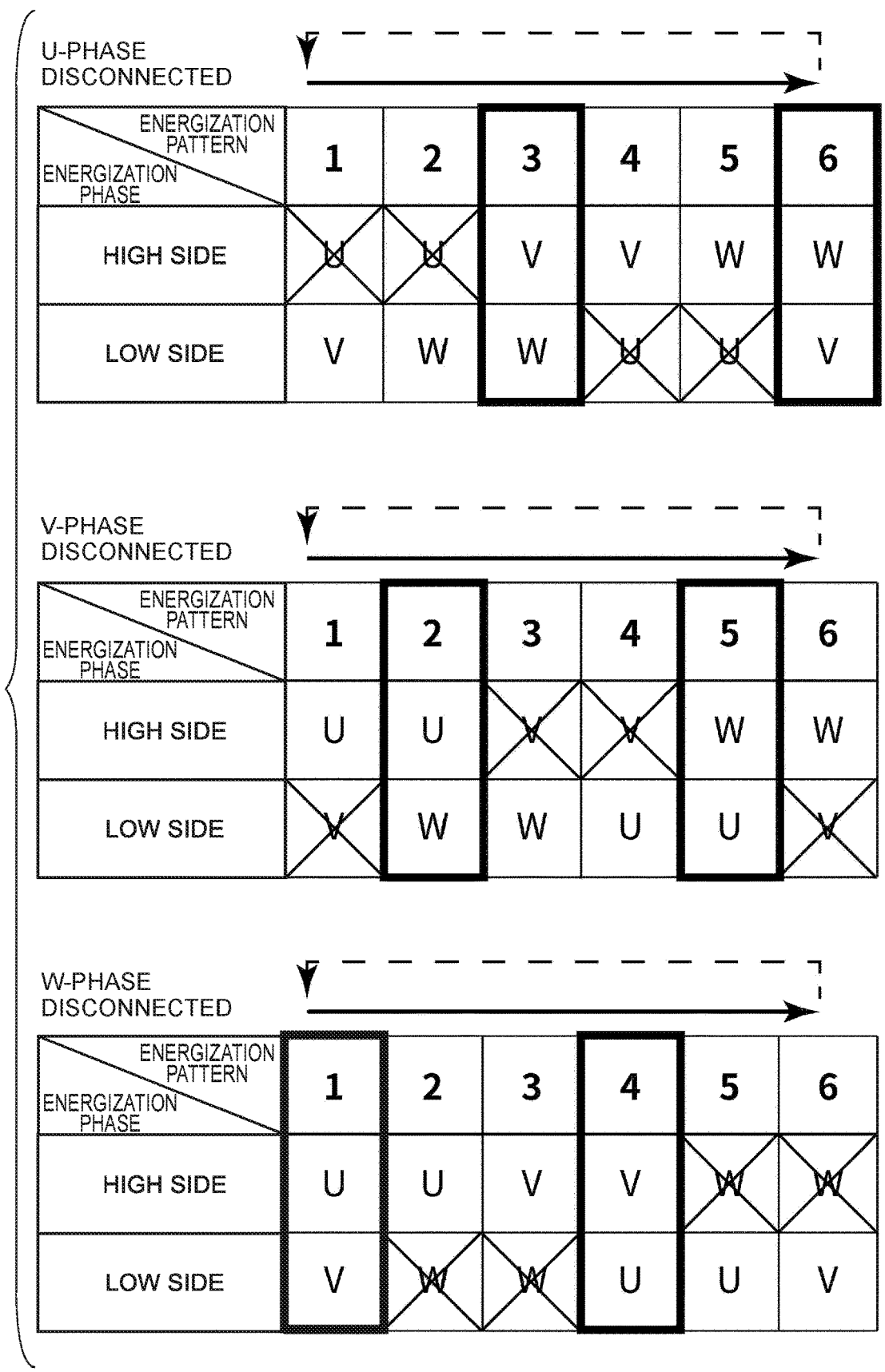
FIG. 4 is a table showing a relationship between a phase in which a coil is disconnected and an energization pattern in which no current flows.

FIG. 4 is a table showing the relationship between the phase in which the coil is disconnected and the energization pattern in which no current flows.

In FIG. 4, with respect to a case in which the coil Lu of the U-phase is disconnected (upper stage), a case where the coil Lv of the V-phase is disconnected (middle stage) and a case where the coil Lw of the W-phase is disconnected (lower stage), these statuses are shown by enclosing, with thick-bordered boxes, the energization patterns in which current flows normally. Accordingly, the other energization patterns are energization patterns in which no current flows. In addition, a mark (x) in the table indicates that the coil of the corresponding phase is disconnected.

As shown in FIG. 4, when the coil Lu of the U-phase is disconnected, the drive current of the motor 20 flows in the two energization patterns of the third and sixth energization patterns in which no current flows in the coil Lu of the U-phase, but no drive current flows in the other energization patterns.

When the coil Lv of the V-phase is disconnected, the drive current of the motor 20 flows in the two energization patterns of the second and fifth energization patterns in which no current flows in the coil Lv of the V-phase, but no current flows in the other energization patterns.

When the coil Lw of the W-phase is disconnected, the drive current of the motor 20 flows in the two energization patterns of the first and fourth energization patterns in which no current flows in the coil Lw of the W-phase, but no drive current flows in the other energization patterns.

Figure 5:
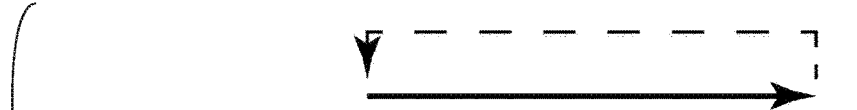
FIG. 5 is a diagram showing comparison result information.
Figure 6:
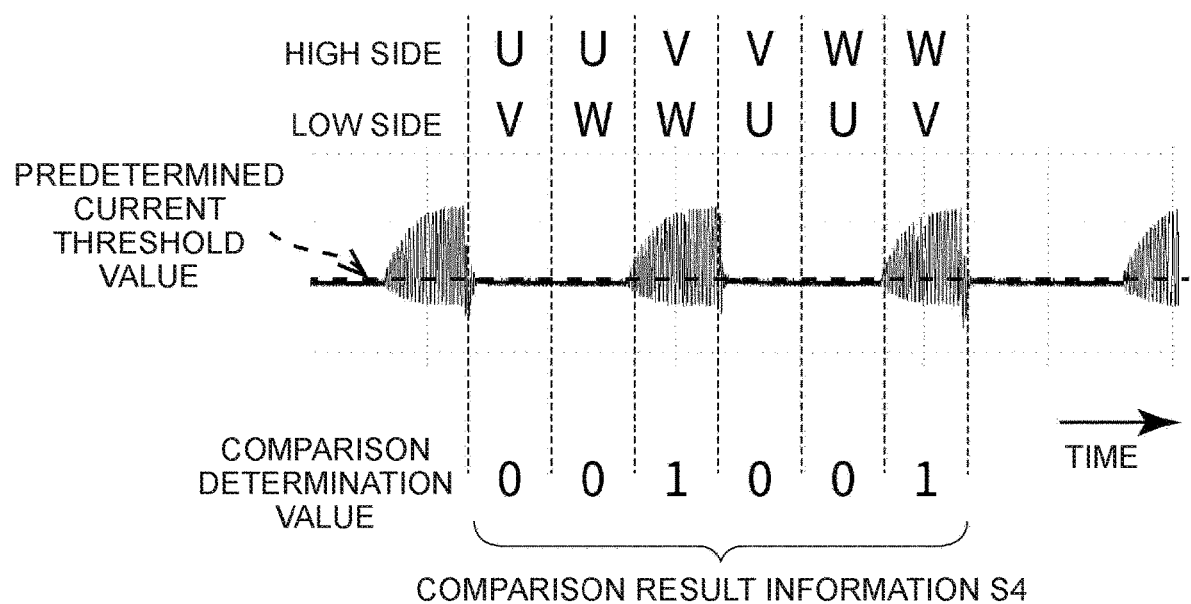
FIG. 6 is a diagram showing comparison result information when one-phase coil is disconnected.

FIG. 5 is a diagram showing the comparison result information S4. FIG. 6 is a diagram showing the comparison result information S4 when the coil Lu of the U-phase is disconnected.

In the present embodiment, the comparison result information S4 is a value in which binary values (may be hereinafter referred to as comparison determination value) of "0" or "1" generated for the respective energization patterns from the head first energization pattern to the last sixth energization during the execution of the one-cycle switching control from the head first energization pattern to the last sixth energization pattern are arranged at respective digits in a predetermined order corresponding to the switching order of the energization patterns. That is, the comparison result information S4 is a six-digit value in binary notation.

When the magnitude of the drive current based on the detection voltage signal Vd is larger than the predetermined current threshold value, that is, when the drive current of the motor 20 is detected, the comparison determination value is set to "1". On the other hand, when the magnitude of the drive current based on the detection voltage signal Vd falls below the predetermined current threshold value, that is, when the drive current of the motor 20 is not detected, it is set to "0".

As shown in FIG. 5, the comparison determination value generated for the first energization pattern is allocated to the position (digit) of the sixth digit from the right. The comparison determination value generated for the second energization pattern is allocated to the position (digit) of the fifth digit from the right. The comparison determination value generated for the third energization pattern is allocated to the position (digit) of the fourth digit from the right. The comparison determination value generated for the fourth energization pattern is allocated to the position (digit) of the third digit from the right. The comparison determination value generated for the fifth energization pattern is allocated to the position (digit) of the second digit from the right. The comparison determination value generated for the sixth energization pattern is allocated to the position (digit) of the first digit from the right. In other words, the voltage comparison circuit 37 generates a comparison determination value for each energization pattern each time the energization pattern is switched from the head first energization pattern of the one-cycle switching control. Furthermore, the voltage comparison circuit 37 performs a calculation for adding the value at the digit corresponding to the energization pattern to the comparison result information S4. When the calculation for the comparison result information S4 is performed based on the comparison determination value for the last sixth energization pattern of the one-cycle switching control, the generation of the comparison result information S4 is completed.

An example of the waveform of the drive current and the energization phases when the coil Lu of the U-phase is disconnected are shown in FIG. 6. As shown in FIG. 6, when the coil Lu of the U-phase is disconnected, the drive current is detected in the third energization pattern and the sixth energization pattern. That is, the comparison result information S4 is expressed as "001001" in binary notation.

As shown in FIG. 5, the comparison result information S4 can be expressed in hexadecimal notation. When the coil Lu of the U-phase is disconnected, the comparison result information S4 is expressed as "0x09" in hexadecimal notation.

Likewise, when the coil Lv of the V-phase is disconnected, the drive current is detected in the second energization pattern and the fifth energization pattern. That is, the comparison result information S4 is expressed as "010010" in binary notation and as "0x12" in hexadecimal notation.

When the coil Lw of the W-phase is disconnected, the drive current is detected in the third energization pattern and the sixth energization pattern. That is, the comparison result information S4 is expressed as "100100" in binary notation, and expressed as "0x24" in hexadecimal notation.

When no disconnection occurs, "1" is arranged for each digit of the comparison result information S4 because the drive current is detected in any of the energization patterns. That is, the comparison result information S4 is expressed as "111111" in binary notation, and as "0x3f" in hexadecimal notation.

Figure 7:
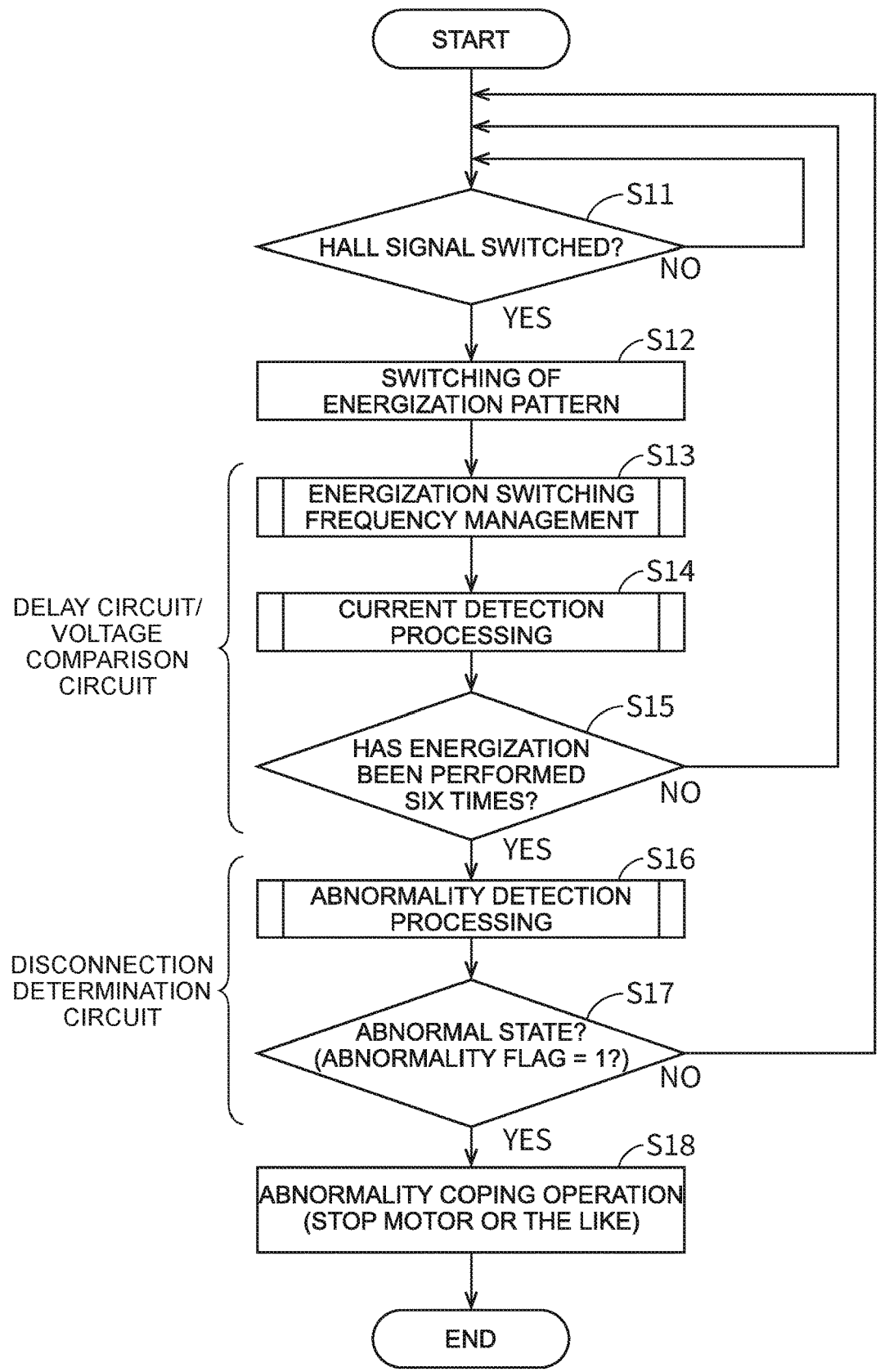
FIG. 7 is a flowchart showing an operation of the control circuit unit.

FIG. 7 is a flowchart showing the operation of the control circuit unit 4.

The control circuit unit 4 performs the following operation when the motor driving control device 1 operates.

As shown in FIG. 7, in step S11, the control circuit unit 4 determines whether the Hall signals Hu, Hv, and Hw are switched between the high level and the low level. When it is determined that the Hall signals Hu, Hv, and Hw are switched between the high level and the low level, the control circuit unit 4 switches the energization pattern in step S12. As a result, the energization pattern is switched to a next energization pattern. That is, based on the energization switching command signal S2 output from the energization switching circuit 32, the control signal generation circuit 35 outputs the drive control signal Sd for switching the energization pattern according to the timing at which the Hall signals Hu, Hv, and Hw are switched between the high level and the low level.

When the energization pattern is switched, the processing of at least the following steps S13 to S15 is performed each time the energization pattern is switched.

In step S13, the voltage comparison circuit 37 performs the energization switching frequency management processing.

In step S14, the voltage comparison circuit 37 performs the current detection processing.

In step S15, the voltage comparison circuit 37 determines whether the energization has been performed six times, based on the value of an energization frequency value C1 managed by energization switching frequency management.

As described later, the energization frequency value C1 is a counter to be incremented each time the energization based on one energization pattern is performed. The energization frequency value C1 is reset to zero each time the one-cycle switching control, that is, the switching operation of the energization pattern has been performed six times. The voltage comparison circuit 37 determines that the energization has been performed six times (YES) when the energization frequency value C1 has reached a predetermined value from 0 to 5 (for example, when C1 is equal to 5). When the energization frequency value C1 is equal to a value other than the predetermined value, the processing returns to the processing of step S11. Here, the count initial value of the energization frequency value C1 and the predetermined value are set so that "YES" is determined in step S15 when the last sixth energization pattern of the one-cycle switching control has been arrived at.

When determining in step S15 that the energization has been performed six times (YES), the disconnection determination circuit 38 performs the processing in steps S16 and S17. That is, each time the one-cycle switching control is performed, the disconnection determination circuit 38 determines whether the motor 20 is in the abnormal state, that is, whether any one phase of the motor 20 is in the disconnection state.

That is, in step S16, the disconnection determination circuit 38 performs the abnormality detection processing.

In step S17, the disconnection determination circuit 38 determines whether the motor 20 is in the abnormal state. Whether the motor 20 is in the abnormal state is determined based on whether an abnormality flag is set by the disconnection determination circuit 38 (whether the abnormality flag is equal to 1) as described later.

When it is determined in step S17 that the motor 20 is not in the abnormal state (NO), the processing returns to the processing of step S11. That is, when the abnormality determination signal S5 corresponding to the abnormal state is not output from the disconnection determination circuit 38, the motor 20 is continuously driven.

When it is determined in step S17 that the motor 20 is in the abnormal state (YES), the processing proceeds to step S18. In step S18, the control circuit unit 4 performs the abnormality coping operation. That is, when the abnormality determination signal S5 corresponding to the abnormal state is output from the disconnection determination circuit 38, the control signal generation circuit 35 performs the abnormality coping operation as described above. As a result, for example, the driving of the motor 20 is stopped.

Note that the control circuit unit 4 may perform an operation of re-activating the motor 20 after the driving of the motor 20 is stopped by the abnormality coping operation.

Figure 8:
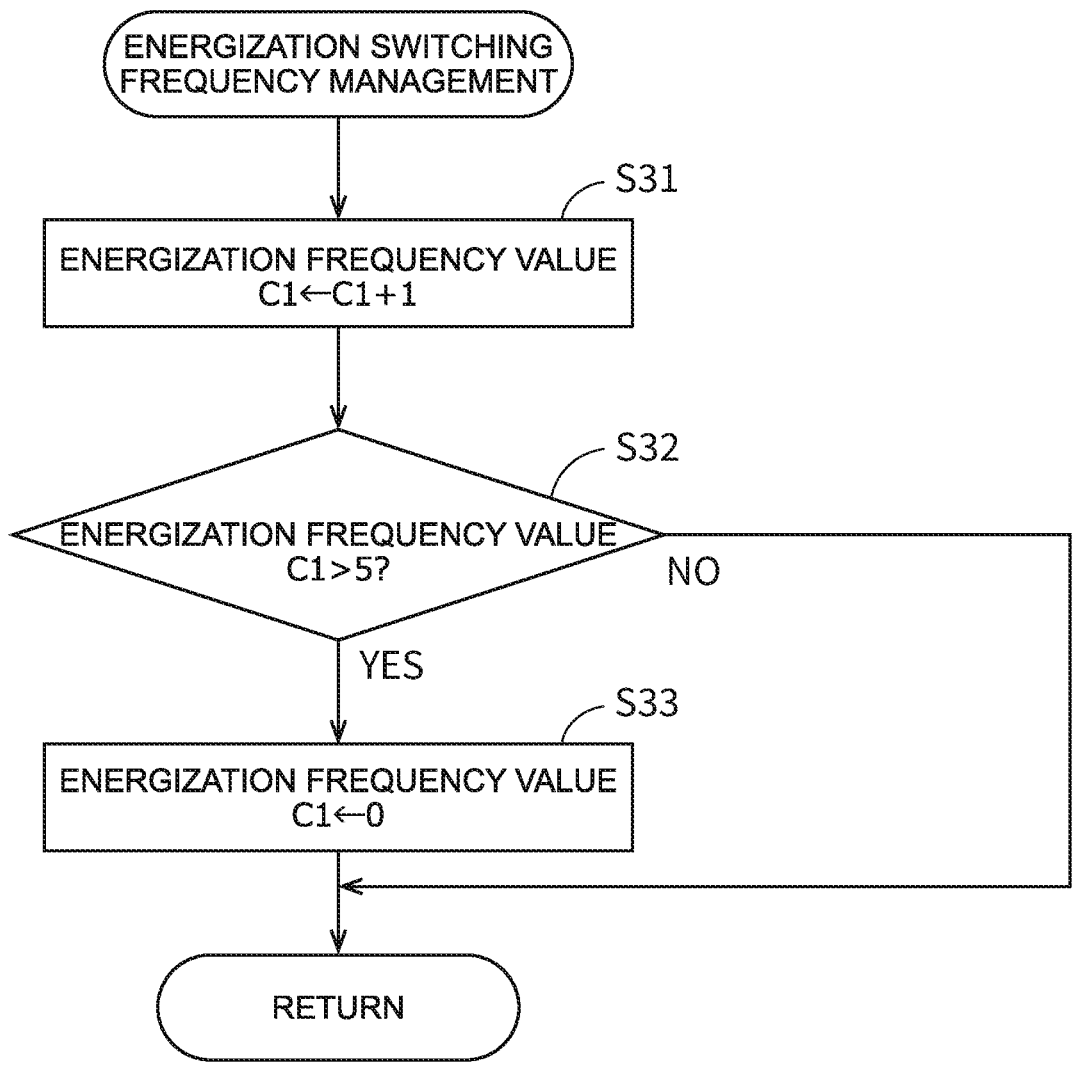
FIG. 8 is a flowchart showing energization switching frequency management processing.

FIG. 8 is a flowchart showing the energization switching frequency management processing.

As shown in FIG. 8, in step S31, the voltage comparison circuit 37 adds "1" to the energization frequency value C1.

In step S32, the voltage comparison circuit 37 determines whether the energization frequency value C1 is greater than 5. When the energization frequency value C1 is larger than 5 (YES), the processing proceeds to step S33. When the energization frequency value C1 is not larger than 5 (NO), the energization switching frequency management processing is finished.

In step S33, the voltage comparison circuit 37 resets the energization frequency value C1 to zero, and the energization switching frequency management processing finishes.

That is, in the present embodiment, the energization frequency value C1 takes any one of 0, 1, 2, 3, 4, and 5. The energization frequency value C1 is incremented by 1 each time the energization pattern switching control is performed once, and takes the same value each time the switching control is performed six times. Each time the one-cycle switching control is performed, counting of the energization frequency value C1 is repeated.

Figure 9:
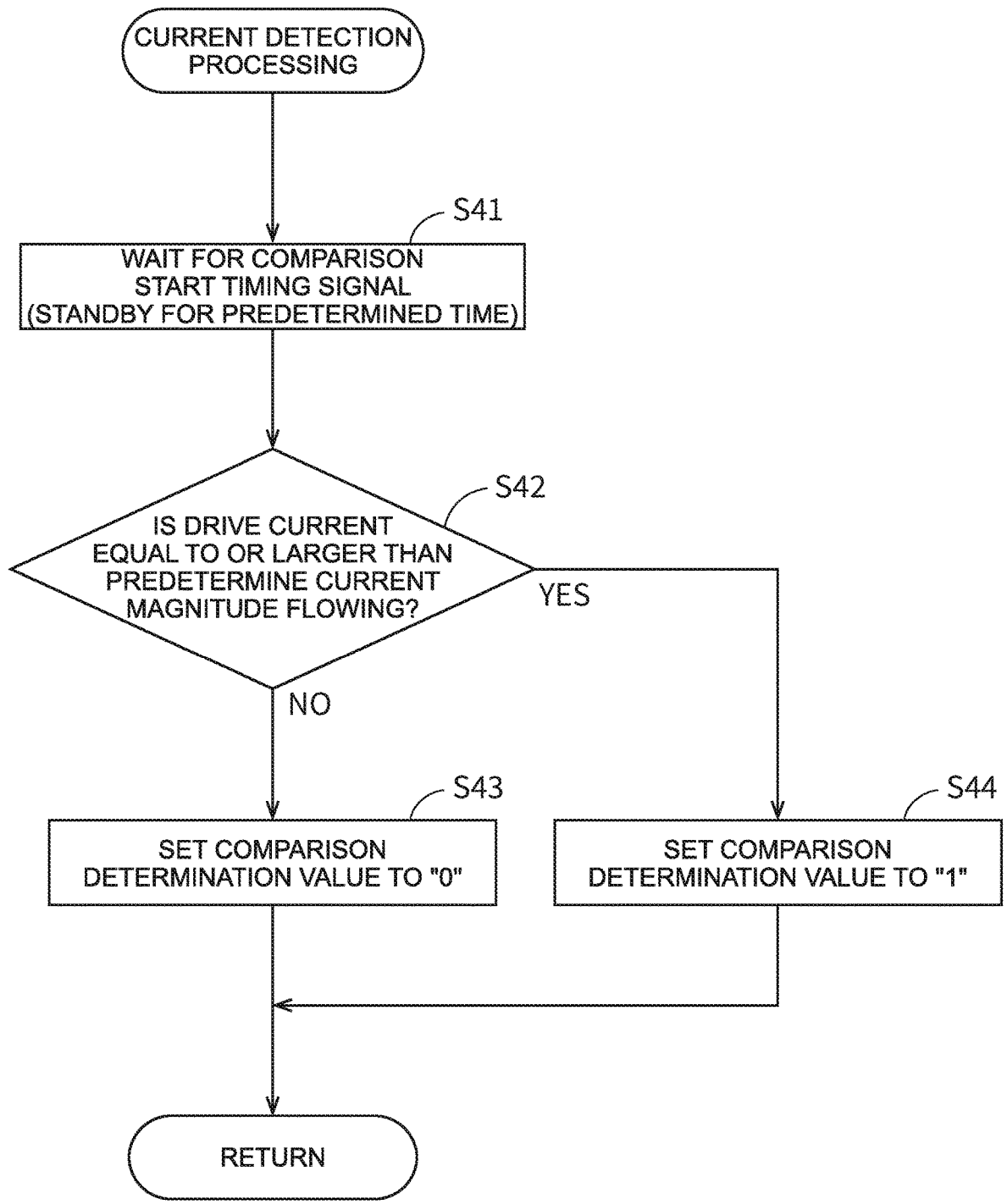
FIG. 9 is a flowchart showing current detection processing.

FIG. 9 is a flowchart showing the current detection processing.

In the current detection processing, a comparison determination value is generated according to a detection result of whether the magnitude of the drive current of the motor 20 exceeds a predetermined current threshold, that is, whether the drive current of motor 20 flows.

As shown in FIG. 9, in step S41, the voltage comparison circuit 37 is on standby until the comparison start timing signal S3 is input. In other words, the voltage comparison circuit 37 is on standby for a predetermined time from the time when switching of the energization pattern is performed. When the comparison start timing signal S3 is input, the processing proceeds to the next process.

In step S42, the voltage comparison circuit 37 detects whether a drive current equal to or larger than the magnitude of a predetermined current flows. That is, based on the detection voltage signal Vd, the voltage comparison circuit 37 determines whether the magnitude of the drive current exceeds a predetermined current threshold value. When the magnitude of the drive current exceeds the current threshold value, it is detected that the motor 20 is in a state where the drive current flows. When the motor 20 is not in the state where the drive current flows (NO), the processing proceeds to step S43, and when the motor 20 is in the state where the drive current flows (YES), the processing proceeds to step S44.

In step S43, the voltage comparison circuit 37 sets the comparison determination value to "0". That is, the value of the digit corresponding to the energization pattern out of the digits of the comparison result information S4 is set to "0".

On the other hand, in step S44, the voltage comparison circuit 37 sets the comparison determination value to "1". That is, the value at the digit corresponding to the energization pattern out of the digits of the comparison result information S4 is set to "1".

When the processing of step S43 or step S44 is performed, the current detection processing is finished. As shown in FIG. 7, the voltage comparison circuit 37 can determine, based on the value of the energization frequency value C1, whether the energization has been performed six times, that is, whether the one-cycle switching control has been performed (step S15). Each time the one-cycle switching control is performed (YES), the abnormality detection processing in step S16 is performed.

Figure 10:
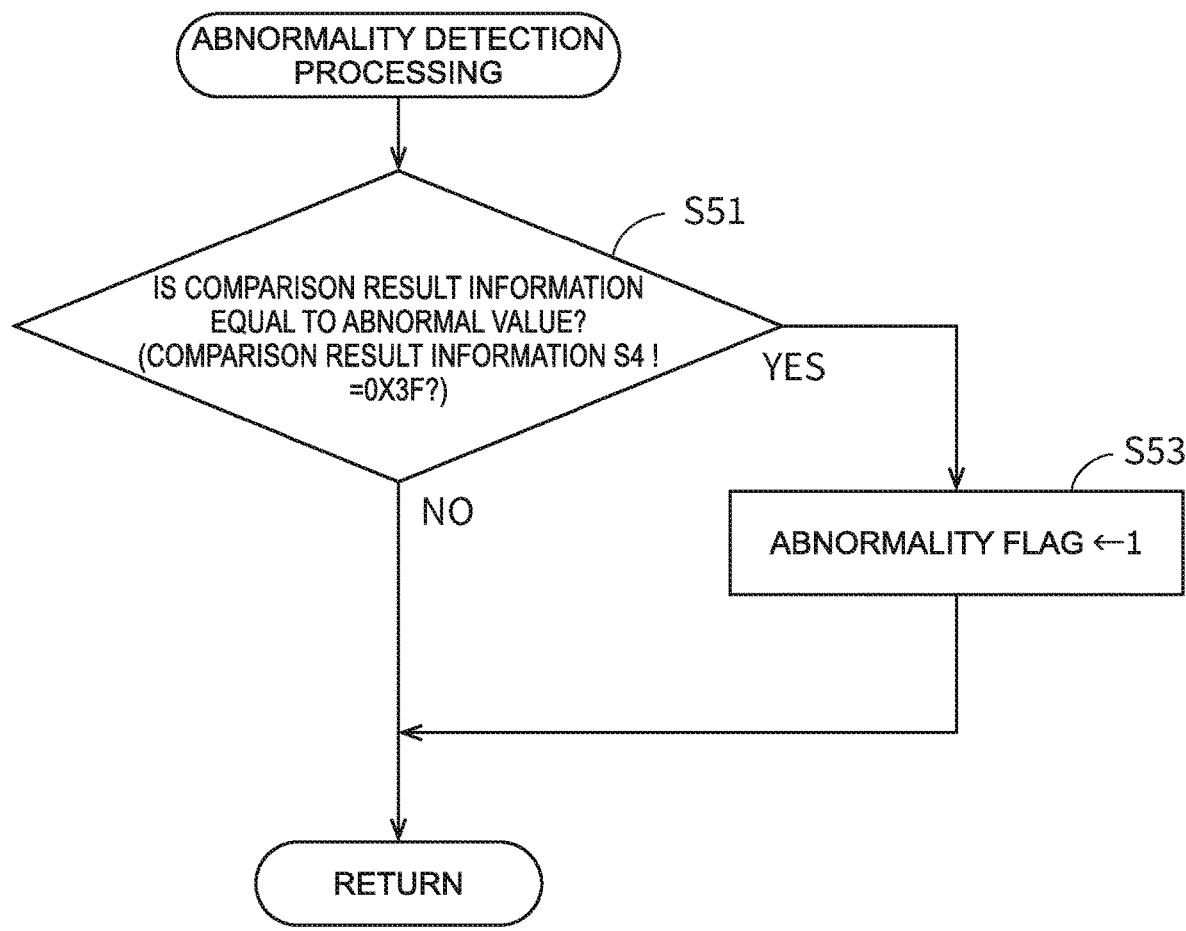
FIG. 10 is a flowchart showing an example of abnormality detection processing.

FIG. 10 is a flowchart showing an example of the abnormality detection processing.

In the abnormality detection processing, based on the detection result of the drive current for each energization pattern, that is, the comparison result information S4 during execution of the one-cycle switching control, it is determined whether the motor 20 is in the abnormal state in which any one phase of the motor 20 is in the disconnection state. Based on whether the comparison result information S4 is coincident with predetermined abnormal value information, the disconnection determination circuit 38 determines whether any one phase of the motor 20 is in the disconnection state.

In the present embodiment, based on the comparison result information S4, it is determined that the motor 20 is in the abnormal state in cases other than the case where the drive current is detected for all the energization patterns while the one-cycle switching control is performed (while the six energization patterns are ordinarily switched). That is, the disconnection determination circuit 38 determines whether any one phase of the motor 20 is in the disconnection state based on whether the comparison result information S4 is coincident with a value other than "0x3f" in hexadecimal notation (an example of the predetermined abnormal value information). The condition of the value of the comparison result information S4 for determining that the motor 20 is in the abnormal state is not limited to the above value, and for example, it may be determined that the motor 20 is in the abnormal state only when the comparison result information S4 is equal to any one of "0x09", "0x12", and "0x24" (an example of the predetermined abnormal value information).

As shown in FIG. 10, in step S51, the disconnection determination circuit 38 determines whether the comparison result information S4 is an abnormal value, that is, whether the comparison result information S4 is a value other than "0x3f" in hexadecimal notation. When the comparison result information S4 is an abnormal value (YES), the processing proceeds to step S53, and when it is not an abnormal value (NO), the abnormality detection processing is finished.

In step S53, the disconnection determination circuit 38 sets the abnormality flag to "1". Thereafter, the abnormality detection processing is finished.

As described above, when the abnormality flag is set to 1 and the abnormality detection processing is finished, the disconnection determination circuit 38 determines that the motor 20 is in the abnormal state as shown in FIG. 7 (YES in step S17). As a result, the abnormality coping operation is performed (step S18).

As described above, in the present embodiment, based on the comparison result of the voltage comparison circuit 37 for the plural energization patterns, it is determined whether any one phase of the motor 20 is in the disconnection state. Since the disconnection state of the coil can be detected by using the detection voltage signal Vd corresponding to the drive current of the motor 20, it can be precisely determined with a simple circuit configuration that any one phase coil is disconnected. By appropriately setting the predetermined current threshold value, it is possible to detect occurrence of disconnection of a specific phase quickly and accurately.

The timing at which the voltage comparison circuit 37 compares the magnitude of the drive current with the predetermined current threshold value based on the detection voltage signal Vd for each energization pattern is a timing which is delayed by a predetermined time from the switching timing of the energization pattern. Generally, off-timings of the plural switching elements Q1 to Q6 included in the inverter circuit 2*a* of the motor driving unit 2 are delayed with respect to the output timing of the drive control signal Sd output from the control circuit unit 4. Therefore, in consideration of this delay, the magnitude of the drive current and the predetermined current threshold value are compared with each other at the timing delayed by the predetermined time from the timing at which the energization pattern is switched, so that the comparison can be performed at a more appropriate timing.

For example, in a case where the motor 20 is used as one of the plural fan motors used for the purpose of ventilating the inside of an apparatus, upon occurrence of a failure of one motor 20, the motor 20 rotates reversely due to a pressure difference between the inside and the outside of the apparatus, which may cause a problematic drop in ventilation ability. In the present embodiment, the motor 20 can reliably detect occurrence of disconnection in the coil of one phase, so that, when possible, the motor 20 can be driven by using a non-disconnected coil or a countermeasure to the above problem can be promptly taken.

[Description on Variant of the Present Embodiment]

The comparison result information S4 is information indicating the presence or absence of the flow of the drive current in each energization pattern during execution of the one-cycle switching control. Therefore, the disconnection determination circuit 38 may be configured to be able to identify one phase under the disconnection state based on the comparison result of the voltage comparison circuit 37, that is, the comparison result information S4. In this case, the abnormality determination signal S5 indicating the abnormal state and a phase determined to be in the disconnection state is output from the disconnection determination circuit 38, and the control signal generation circuit 35 may perform the abnormality coping operation according to the phase determined to be in the disconnection state.

For example, if activation of the motor 20 is started after one phase under the disconnection state is identified by the disconnection determination circuit 38, the control circuit unit 4 can lock the rotor of the motor 20 to a phase different from the one phase under the disconnection state, and then start the activation. As a result, it is possible to infallibly perform a rotor locking operation of the motor 20 by using a phase that is not disconnected, and the motor 20 can be infallibly re-activated.

Furthermore, for example, unlike the above-described embodiment, a case in which the motor driving control device 1 performs one-sensor drive (only one position detection sensor is provided, and the control circuit unit 4 uses the position detection sensor to output the drive control signal Sd) is assumed. In this case, when the coil of a specific phase is disconnected in relation to a phase provided with the only position detection sensor, it becomes impossible to reactivate the motor 20. For example, when a Hall element corresponding to the W-phase is provided as the position detection sensor, reactivation can be performed even when the V-phase is disconnected, but reactivation may be impossible when the W-phase or the U-phase is disconnected (reverse rotation may occur). In the motor driving control device 1 for performing such one-sensor drive, when one phase under the disconnection state is identified by the disconnection determination circuit 38, it may be switched based on the identification result of the one phase under the disconnection state if the control signal generation circuit 35 functioning as the drive stopping unit stops the driving of the motor 20. That is, when it is impossible to reactivate the motor 20 as a result of disconnection of the coil of one phase, the driving of the motor 20 may not be stopped, and in other cases the driving of the motor 20 may be stopped. As a result, the motor 20 can be kept in a rotatable state as much as possible.

Furthermore, as in the case of a variant shown below, there is assumed a case where the motor driving control device has an auxiliary energization circuit capable of energizing any two phases of the motor 20, for example.

Figure 11:
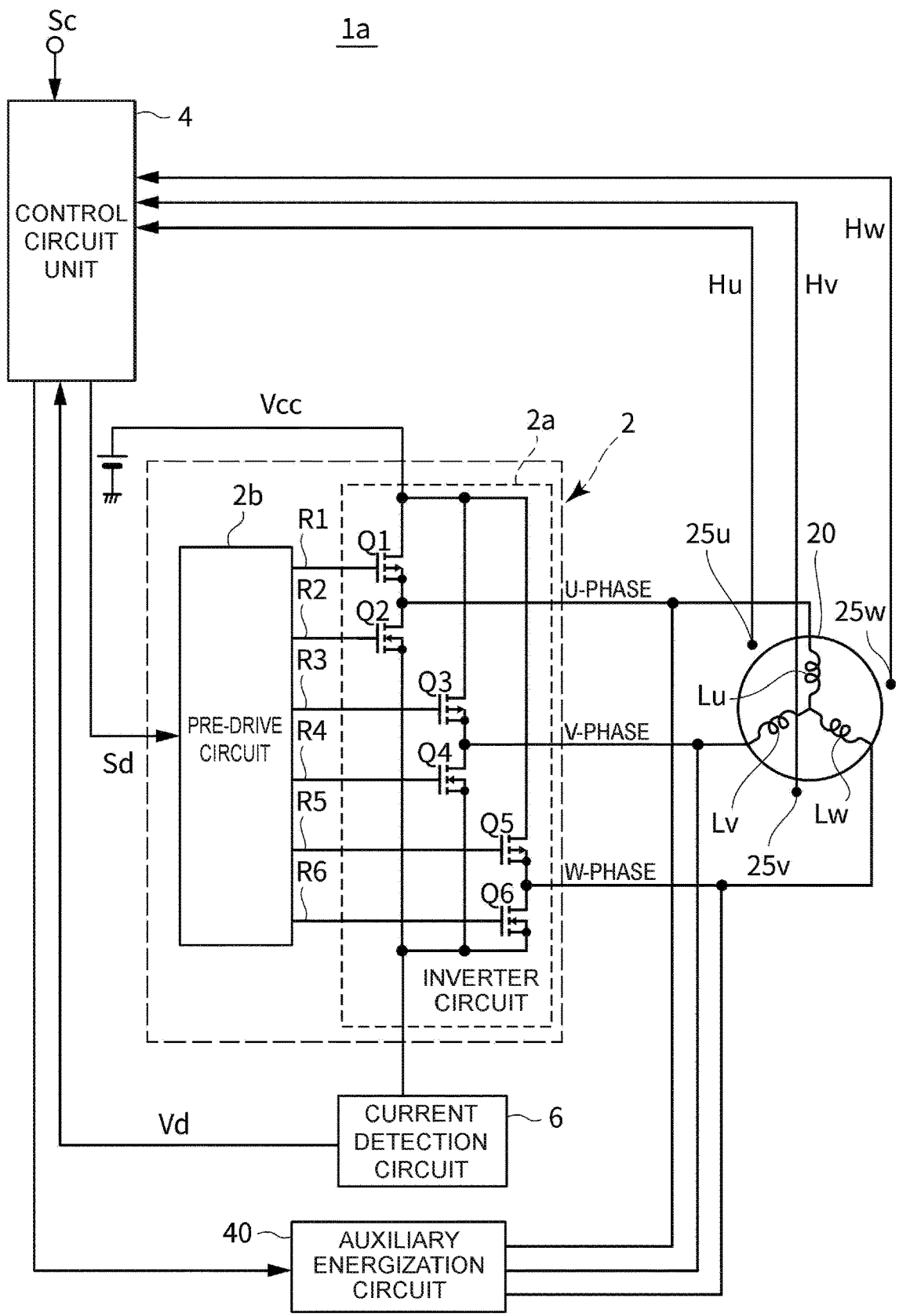
FIG. 11 is a diagram showing a circuit configuration of a motor driving control device according to a first variant of the present embodiment.

FIG. 11 is a diagram showing a circuit configuration of the motor driving control device according to an embodiment of the present disclosure.

In addition to the circuit configuration of the motor driving control device 1, the motor driving control device 1a includes an auxiliary energization circuit 40. In this case, when one phase under the disconnection state is identified by the disconnection determination circuit 38, the control circuit unit 4 may energize predetermined two phases (in this example, the V-phase and the W-phase) other than the identified one phase under the disconnection state (in this example, the U-phase) by using the auxiliary energization circuit 40, thereby starting the motor 20. As a result, for example, in the case in which the motor driving control device 1a performs the one-sensor drive as described above, the motor can be activated by the auxiliary energization circuit 40 even when the motor driving unit 2 itself cannot activate the motor 20 alone as a result of disconnection of the coil of one phase.

Furthermore, for example, as in the case of a variant described below, when detection of the drive current for only an energization pattern corresponding to the phase of a disconnected coil occurs continuously during execution of the one-cycle switching control, it may be determined that the motor 20 is in the abnormal state.

Figure 12:
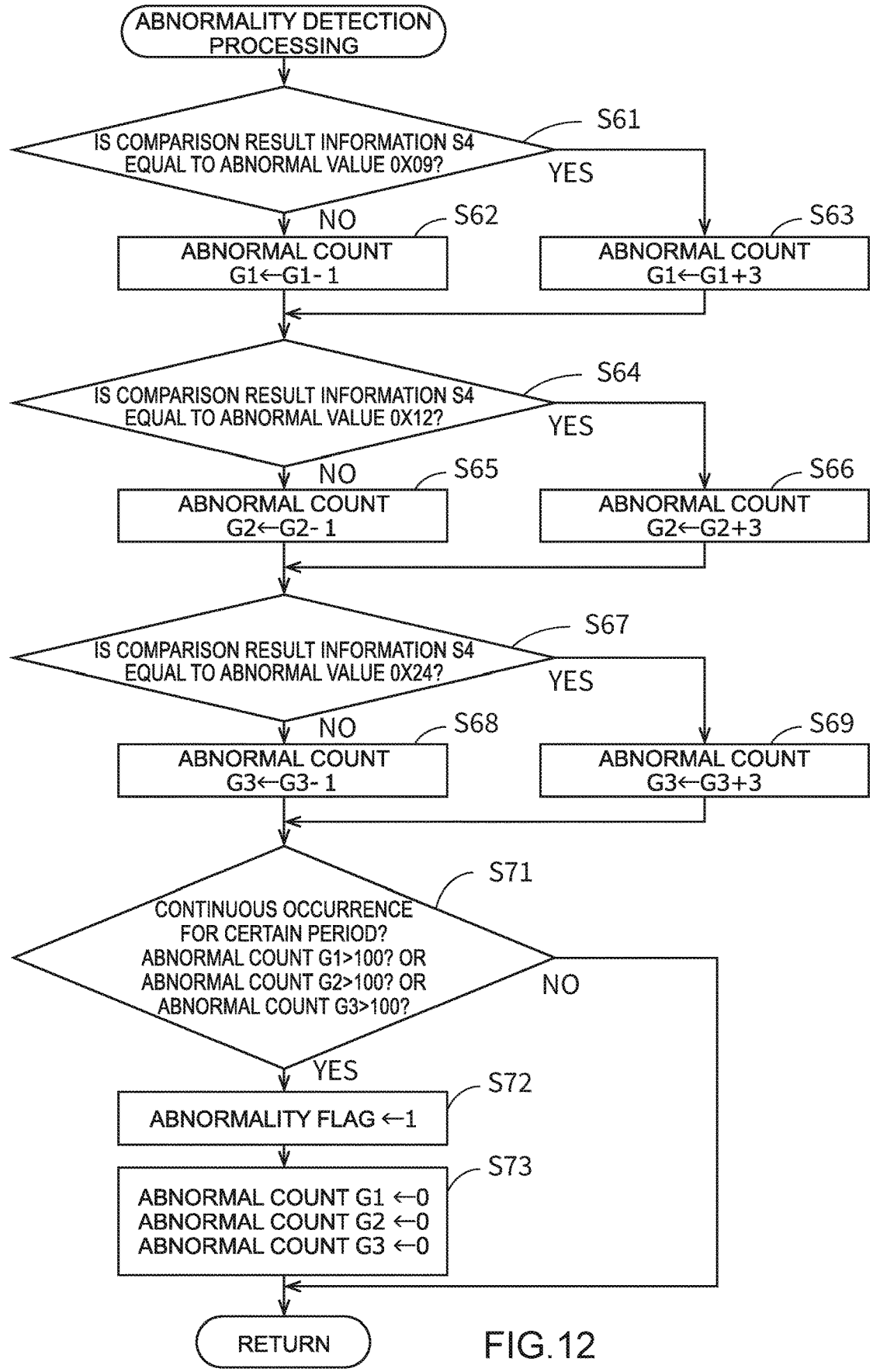
FIG. 12 is a flowchart showing an example of the abnormality detection processing according to a variant of the present embodiment.

FIG. 12 is a flowchart showing an example of the abnormality detection processing according to a variant of the present embodiment.

In the present variant, each time the one-cycle switching control is executed, the disconnection determination circuit 38 calculates a new determination value based on an evaluation value based on a comparison result of the voltage comparison circuit 37 during execution of the one-cycle switching control and a determination value calculated based on past evaluation values, and determines whether the driving of the motor 20 is in an abnormal state based on a comparison result between the new determination value and a predetermined abnormality determination threshold value. That is, in the present variant, each time the one-cycle switching control is executed, a new determination value (new abnormality counts G1, G2 and G3) is calculated based on an estimation result based on the comparison result information S4 and determination values calculated based on past evaluation values (may be hereinafter referred to as abnormality counts G1, G2 and G3). Based on a comparison result between the new abnormality counts G1, G2, and G3 and a predetermined abnormality determination threshold value, it is determined whether the motor 20 is in the abnormal state. In the present embodiment, when the abnormality counts G1, G2, and G3 exceed the predetermined abnormality determination threshold value, it is determined that the motor 20 is in the abnormal state.

As shown in FIG. 12, in step S61, the disconnection determination circuit 38 determines whether the comparison result information S4 is an abnormal value indicating an U-phase disconnection, that is, whether the comparison result information S4 is equal to "0x09" in hexadecimal notation (an example of the predetermined abnormal value information).

When it is not determined that the comparison result information S4 is the abnormal value indicating the U-phase disconnection (NO), the processing proceeds to step S62. In step S62, the disconnection determination circuit 38 subtracts 1 (an example of the evaluation value) from the value of the abnormality count G1 corresponding to the U-phase.

On the other hand, when it is determined that the comparison result information S4 is the abnormal value indicating the U-phase disconnection (YES), the processing proceeds to step S63. In step S63, the disconnection determination circuit 38 adds 3 (an example of the evaluation value) to the value of the abnormality count G1. That is, when the comparison result information S4 corresponding to a case where the coil Lu of the U-phase is disconnected is input, the disconnection determination circuit 38 adds 3 to the value of the abnormality count G1.

Next, in step S64, the disconnection determination circuit 38 determines whether the comparison result information S4 is an abnormal value indicating a V-phase disconnection, that is, whether the comparison result information S4 is equal to "0x12" in hexadecimal notation (an example of the predetermined abnormal value information).

When it is not determined that the comparison result information S4 is the abnormal value indicating the V-phase disconnection (NO), the processing proceeds to step S65. In step S65, the disconnection determination circuit 38 subtracts 1 (an example of the evaluation value) from the value of the abnormality count G2 corresponding to the V phase.

On the other hand, when it is determined that the comparison result information S4 is the abnormal value indicating the V-phase disconnection (YES), the processing proceeds to step S66. In step S66, the disconnection determination circuit 38 adds 3 (an example of the evaluation value) to the value of the abnormality count G2. That is, when the comparison result information S4 corresponding to a case where the coil Lv of the V-phase is disconnected is input, the disconnection determination circuit 38 adds 3 to the value of the abnormality count G2.

Next, in step S67, the disconnection determination circuit 38 determines whether the comparison result information S4 is an abnormal value indicating a W-phase disconnection, that is, whether the comparison result information S4 is equal to "0x24" in hexadecimal notation (an example of the predetermined abnormal value information).

When it is not determined that the comparison result information S4 is the abnormal value indicating the W-phase disconnection (NO), the processing proceeds to step S68. In step S68, the disconnection determination circuit 38 subtracts 1 (an example of the evaluation value) from the value of the abnormality count G3 corresponding to the W-phase.

On the other hand, when it is determined that the comparison result information S4 is the abnormal value indicating the W-phase disconnection (YES), the processing proceeds to step S69. In step S69, the disconnection determination circuit 38 adds 3 (an example of the evaluation value) to the value of the abnormality count G3. That is, when the comparison result information S4 corresponding to a case where the coil Lw of the W-phase is disconnected is input, the disconnection determination circuit 38 adds 3 to the value of the abnormality count G3.

In the present embodiment, the evaluation value "3" to be added to the abnormality counts G1, G2, and G3 in a case where an overcurrent state is determined for some energization patterns is weighted to be larger than the evaluation value "1" to be subtracted from the abnormality counts G1, G2 and G3 in a case where an overcurrent state is not determined.

In step S71, the disconnection determination circuit 38 determines whether input of the comparison result information S4 corresponding to the coil disconnection state of a specific one phase occurs continuously for a certain period. That is, the disconnection determination circuit 38 determines whether the value of the abnormality count G1 corresponding to the U-phase is larger than a predetermined abnormality determination threshold value (for example, 100). Furthermore, the disconnection determination circuit 38 determines whether the value of the abnormality count G2 corresponding to the V-phase is larger than a predetermined abnormality determination threshold value (for example, 100). Furthermore, the disconnection determination circuit 38 determines whether the value of the abnormality count G3 corresponding to the W-phase is larger than a predetermined abnormality determination threshold value (for example, 100).

When it is determined that any one of the abnormality counts G1, G2, and G3 is larger than the predetermined abnormality determination threshold value (YES), the processing proceeds to step S72.

In step S72, the disconnection determination circuit 38 sets the abnormality flag to 1 (sets the abnormality flag). In step S73, the disconnection determination circuit 38 resets the abnormality counts G1, G2, and G3 to zero, and the abnormality detection processing is finished. As described above, when the abnormality flag is set to 1 and the abnormality detection processing is finished, the disconnection determination circuit 38 determines that the motor 20 is in the abnormal state as shown in FIG. 7 (YES in step S17). As a result, the abnormality coping operation is performed (step S18).

On the other hand, when it is not determined in step S71 that none of the abnormality counts G1, G2, and G3 is larger than the predetermined abnormality determination threshold value (NO), the abnormality detection processing is finished. Therefore, the disconnection determination circuit 38 does not determine that the motor 20 is in the abnormal state.

In this case, when a next one-cycle switching control is performed, addition or subtraction of a predetermined value (addition of 3 or subtraction of 1) is performed on the abnormality counts G1, G2, and G3 at this time in accordance with the comparison result information S4, that is, the comparison result of the voltage comparison circuit 37.

As described above, in the present variant, it is also possible to accurately detect disconnection of the coils with a simple configuration as in the above-described embodiment. Furthermore, in the present variant, since it is determined whether the motor 20 is in the abnormal state according to a result obtained by performing, a multiple of times, a unit of determination based on a comparison result during one-cycle switching control, erroneous detection can be infallibly prevented.

In the case of the variant shown in FIG. 12, a phase in which disconnection has occurred can also be identified based on which one of the abnormality counts G1, G2, and G3 has become larger than the predetermined abnormality determination threshold value.

[Others]

The motor driving control device is not limited to a circuit configuration as shown in the above embodiment and the variant of the embodiment. Various circuit configurations configured to meet the object of the present disclosure can be applied.

The motor to be driven by the motor driving control device of the present embodiment is not limited to a brushless motor, but may be another type of motor.

The number of the plural energization patterns to be considered for performing the determination on the disconnection state is not limited to six. For example, in the above-described embodiment, the disconnection determination unit may determine whether the motor is in the abnormal state based on a voltage comparison result for three energization patterns of the first energization pattern, the second energization pattern and the third energization pattern during execution of the one-cycle switching control each time the one-cycle switching control for switching the six energization patterns is performed.

The predetermined current threshold value to be compared with the drive current of the motor can be arbitrarily set.

The rotational speed command signal to be input to the control circuit unit may be generated in the motor driving control device.

No particular limitation is imposed on the rotor position detection method and the rotational speed detection method.

The position detection signal of the motor may be obtained by using a detector different from the Hall element. For example, a Hall IC or the like may be used. Also, for example, the number of Hall elements is not limited to three. The driving may be performed in so-called one-sensor mode by using one Hall element. Furthermore, the motor driving control device may perform so-called sensorless driving in which the motor is driven by using no position detection sensor.

The above-described flowcharts and the like show an example for describing the operations, and the present disclosure is not limited to these flowcharts and the like. The steps of the flowcharts shown in each figure are specific examples, and the present disclosure is not limited to this flow. For example, the order of the respective steps may be changed, or another step may be inserted between the steps, or the processing may be parallelized.

A part or all of the processing in the embodiment described above may be performed by software or may be performed by using a hardware circuit. For example, the control unit is not limited to a microcomputer. At least a part of the internal configuration of the control unit may be processed by software.

It is to be understood that the above-described embodiment is illustrative in all respects and is not restrictive. The scope of the present disclosure is defined not by the above description, but by the scope of the claims, and it is intended to include meanings equivalent to the claims and all changes within the scope.

What is claimed is:

1. A motor driving control device comprising:
   a motor driving unit that has a plurality of switching elements and supplies a drive current to three-phase coils of a motor;
   a control circuit unit for sequentially switching energization patterns of the three-phase coils by outputting a drive control signal for operating the plurality of switching elements to the motor driving unit, wherein during at least one of the energization patterns no drive current flows through at least one phase of at least one of the three-phase coils;
   a current detection circuit for detecting a voltage value corresponding to a magnitude of the drive current,
   wherein the control circuit unit includes:
      a voltage comparison unit that:
         compares the magnitude of the drive current with a predetermined current threshold value based on the voltage value each time switching of the energization patterns is performed,
         generates a binary value indicating whether the magnitude of the drive current is larger than the predetermined current threshold value each time the switching of the energization patterns is performed, and
         generates a comparison result information in which the binary values generated for each of the energization patterns during execution of a one-cycle switching control are arranged in respective digits in a predetermined order corresponding to a switching order of the energization patterns each time the one-cycle switching control is performed, and
      a disconnection determination unit which:
         detects whether current exceeding the predetermined current threshold value is not flowing to the at least one phase of the at least one of the three-phase coils at a time when an energization pattern that causes current to flow to the phase of the motor is set, based on the comparison result information of the voltage comparison unit for each of the energization patterns, and determines whether a coil corresponding to the at least one phase of the at least one of the three-phase coils is disconnected, wherein the disconnection determination unit determines whether the comparison result including digits corresponding to each comparison result of the voltage comparison unit for each of the energization patterns is coincident with a preset value indicating that any one phase of the three-phase coils is disconnected, wherein the disconnection determination unit determines whether the coil corresponding to the at least one phase is in a disconnection state, wherein the control circuit unit is provided in association with each of the three-phase coils, and is configured to output the drive control signal by using three position detection sensors for outputting a signal according to a rotational position of the motor, and the disconnection determination unit identifies one phase in a disconnection state based on the comparison result of the voltage comparison unit, and when activation of the motor is started after one phase in a disconnection state is identified by the disconnection determination unit, the control circuit unit starts the activation of the motor after a rotor of the motor is locked to a phase different from the one phase in the disconnection state.

2. The motor driving control device according to claim 1, wherein the control circuit unit repeatedly performs a one-cycle switching control by successively switching the energization patterns of the three-phase coils in a predetermined order, wherein each energization pattern indicates a path of the drive current flowing through two of the three-phase coils, and the disconnection determination unit determines whether any one phase of the motor is in the disconnection state, based on a comparison result of the voltage comparison unit during execution of the one-cycle switching control each time the one-cycle switching control is performed.

3. The motor driving control device according to claim 1, wherein each time the one-cycle switching control is executed, the disconnection determination unit determines an evaluation value based on the comparison result of the voltage comparison unit during execution of the one-cycle switching control and calculates a new abnormality count based on the evaluation value and past abnormality counts, and determines whether the motor is in an abnormal state based on a comparison result between the new abnormality count and a predetermined abnormality determination threshold value.

4. The motor driving control device according to claim 1, wherein the control circuit unit further includes a delay circuit for generating a comparison start timing signal indicating a timing that is delayed by a predetermined time from a timing at which the energization pattern is switched each time switching of the energization patterns is performed, and the voltage comparison unit compares, based on the comparison start timing signal, the magnitude of the drive current with a predetermined current threshold value based on the voltage value at the timing which is delayed by the predetermined time from the timing at which the energization pattern is switched.

5. The motor driving control device according to claim 1, wherein the control circuit unit further includes a drive stopping unit for performing control of stopping driving of the motor based on a determination result of the disconnection determination unit.

6. The motor driving control device according to claim 2, wherein the voltage comparison unit generates a binary value indicating whether the magnitude of the drive current is larger than the predetermined current threshold value each time the switching of the energization patterns is performed, and generates comparison result information in which binary values generated during execution of the one-cycle switching control are arranged in respective digits in a predetermined order corresponding to a switching order of the energization patterns each time the one-cycle switching control is performed, and the disconnection determination unit determines whether any one phase of the motor is in a disconnection state, based on whether the comparison result information is coincident with predetermined abnormal value information.

7. The motor driving control device according to claim 3, wherein the disconnection determination unit calculates the new abnormality count by subtracting the evaluation value from the abnormality count when the comparison result of the voltage comparison unit is not an abnormal value indicating that any one phase of the motor is disconnected, and calculates the new abnormality count by adding the evaluation value to the abnormality count when the comparison result of the voltage comparison unit is the abnormal value.

8. The motor driving control device according to claim 5, wherein the disconnection determination unit identifies one phase in a disconnection state based on the comparison result of the voltage comparison unit, and when one phase in a disconnection state is identified by the disconnection determination unit, the drive stopping unit switches whether to stop the motor or not.

9. The motor driving control device according to claim 7, wherein the evaluation value is set to a first value when the comparison result of the voltage comparison unit is the abnormal value, and the evaluation value is set to a second value smaller than the first value when the comparison result of the voltage comparison unit is not the abnormal value.

10. A motor driving control device comprising:
a motor driving unit that has a plurality of switching elements and supplies a drive current to three-phase coils of a motor;
a control circuit unit for sequentially switching energization patterns of the three-phase coils by outputting a drive control signal for operating the plurality of switching elements to the motor driving unit, wherein during at least one of the energization patterns no drive current flows through at least one phase of at least one of the three-phase coils;
a current detection circuit for detecting a voltage value corresponding to a magnitude of the drive current,
wherein the control circuit unit includes:
a voltage comparison unit that:
compares the magnitude of the drive current with a predetermined current threshold value based on the voltage value each time switching of the energization patterns is performed,
generates a binary value indicating whether the magnitude of the drive current is larger than the predetermined current threshold value each time the switching of the energization patterns is performed, and generates a comparison result information in which the binary values generated for each of the energization patterns during execution of a one-cycle switching control are arranged in respective digits in a predetermined order corresponding to a switching order of the energization patterns each time the one-cycle switching control is performed;

a disconnection determination unit which:

detects whether current exceeding the predetermined current threshold value is not flowing to the at least one phase of the at least one of the three-phase coils at a time when an energization pattern that causes current to flow to the phase of the motor is set, based on the comparison result information of the voltage comparison unit for each of the energization patterns, and determines whether a coil corresponding to the at least one phase of the at least one of the three-phase coils is disconnected, wherein the disconnection determination unit determines whether the comparison result including digits corresponding to each comparison result of the voltage comparison unit for each of the energization patterns is coincident with a preset value indicating that any one phase of the three-phase coils is disconnected, wherein the disconnection determination unit determines whether the coil corresponding to the at least one phase is in a disconnection state; and an auxiliary energization circuit configured to energize any two phases of the motor, wherein the disconnection determination unit identifies one phase in a disconnection state based on the comparison result of the voltage comparison unit, and when one phase in a disconnection state is identified by the disconnection determination unit, the control circuit unit energizes predetermined two phases other than the identified one phase in the disconnection state by using the auxiliary energization circuit to activate the motor.

11. A motor control method of controlling driving of a motor by using a motor driving control device including a motor driving unit having a plurality of switching elements and supplying a drive current to three-phase coils of the motor, a control circuit unit for sequentially switching energization patterns of the three-phase coils by outputting a drive control signal for operating the plurality of switching elements to the motor driving unit, and a current detection circuit for detecting a voltage value corresponding to magnitude of the drive current, the method comprising:

a voltage comparison step of comparing the magnitude of the drive current with a predetermined current threshold value based on the voltage value each time switching of the energization patterns is performed, generating a binary value indicating whether the magnitude of the drive current is larger than the predetermined current threshold value each time the switching of the energization patterns is performed, and generating a comparison result information in which the binary values generated for each of the energization patterns during execution of a one-cycle switching control are arranged in respective digits in a predetermined order corresponding to a switching order of the energization patterns each time the one-cycle switching control is performed; and a disconnection determination step of detecting whether current exceeding the predetermined current threshold value is not flowing to a phase of the motor at a time when an energization pattern that causes current to flow to the phase of the motor is set, based on the comparison result information of the voltage comparison step for each of the energization patterns, and determining whether a coil corresponding to the phase of the motor is disconnected, wherein the disconnection determination step determines whether the comparison result including digits corresponding to each comparison result of the voltage comparison step for each energization patterns is coincident with a preset value indicating that any one phase of the three-phase coils is disconnected, wherein the disconnection determination step determines whether the coil corresponding to the phase is in a disconnection state, wherein the control circuit unit is provided in association with each of the three-phase coils, and is configured to output the drive control signal by using three position detection sensors for outputting a signal according to a rotational position of the motor, wherein the disconnection determination step identifies one phase in a disconnection state based on the comparison result of the voltage comparison step, and when activation of the motor is started after one phase in a disconnection state is identified by the disconnection determination step, the control circuit unit starts the activation of the motor after a rotor of the motor is locked to a phase different from the one phase in the disconnection state.

\* \* \* \* \*